United States Patent [19]

Yoneyama

[11] Patent Number: 4,892,059

[45] Date of Patent: Jan. 9, 1990

[54] APPARATUS FOR EXCHANGING A NET OF FISH CAGE FOR FARMING FISH

[75] Inventor: Seiichi Yoneyama, Tokyo, Japan

[73] Assignee: Nippon Kokan Kabushiki Kaisha, Tokyo, Japan

[21] Appl. No.: 178,547

[22] Filed: Apr. 7, 1988

[30] Foreign Application Priority Data

Apr. 8, 1987 [JP] Japan .................................. 62-52075

[51] Int. Cl.⁴ ............................................. A01K 61/00
[52] U.S. Cl. ......................................................... 119/3
[58] Field of Search .................................... 119/2, 3, 4

[56] References Cited

U.S. PATENT DOCUMENTS

| 3,304,645 | 2/1967 | Hardesty et al. | 119/3 |
| 3,553,879 | 1/1971 | Ellis | 119/3 X |
| 4,086,875 | 5/1978 | Lindbergh | 119/3 |
| 4,615,301 | 10/1986 | Maekawa et al. | 119/3 |

FOREIGN PATENT DOCUMENTS

| 2446734 | 9/1980 | France | 119/3 |
| 1026735 | 7/1983 | U.S.S.R. | 119/3 |
| 1029942 | 7/1983 | U.S.S.R. | 119/3 |
| 1227137 | 4/1986 | U.S.S.R. | 119/3 |

Primary Examiner—John J. Wilson
Assistant Examiner—R. Thomas Price
Attorney, Agent, or Firm—Fleit, Jacobson, Cohn, Price, Holman & Stern

[57] ABSTRACT

A fish breeding apparatus with an exchangeable net comprises a hull shaped fish cage with side platings, a bottom plating, screen bulkheads and a deck. A pay out roller for paying out a net into the cage is provided, along with a device guiding the net so that an end of the net passes through a predetermined course. A coil-up roller is provided for coiling up the net. Edges of the net each are connected to a guide rope and guide floats, the guide rope is turn being connected, through joint wires, to a side edge portion of the net. The guide floats are fixed to the guide rope and hold the guide rope in the guide rail.

12 Claims, 6 Drawing Sheets

APPARATUS FOR EXCHANGING A NET OF FISH CAGE FOR FARMING FISH

BACKGROUND OF THE INVENTION

1. Field of the Invention

The present invention relates to a fish breeding apparatus with an exchangeable net.

2. Description of the Prior Art

Often, when a certain period of time has passed, dead microorganisms in the sea and live bait remains can to a net of a fish breeding apparatus if the sea water becomes inactive and circulation of the sea water becomes low. If this state is left as it is, fish do not grow well and, at worst, may die. To avoid the above mentioned problem, the net usually must be exchanged every two or three months by one of the following two methods:

(a) Divers join an end of an old net to an end of a new net, and the old and new nets are exchanged by making use of two boats with the old net being coiled up into one boat, and the new net being paid out from the other boat; or (b) A new fish cage is prepared in advance and then fish in an old net or cage already in use are taken out of the old net or cage and put into the new fish cage.

These prior art methods are disadvantageous in that troublesome and time-consuming work, such as joining old and new nets or transferring fish from an old net to a new net.

SUMMARY OF THE INVENTION

The object of the present invention is to provide a fish breeding apparatus with an exchangeable net for farming fish easily.

To attain such an object in accordance with the present invention, the apparatus comprises means for paying out a net into the fish breeding apparatus, means for guiding the net paid out so as to let an edge end of the net pass through a guide path, and means for coiling up the net.

Furthermore, the apparatus may alternatively comprise means for paying out, into the fish cage, a folded and coiled net which has been coiled while folded, means for unfolding the net as it is uncoiled and paid out, means for refolding the unfolded and uncoiled net, and means for recoiling the refolded net.

DESCRIPTION OF THE PREFERRED EMBODIMENTS

Figure 2:
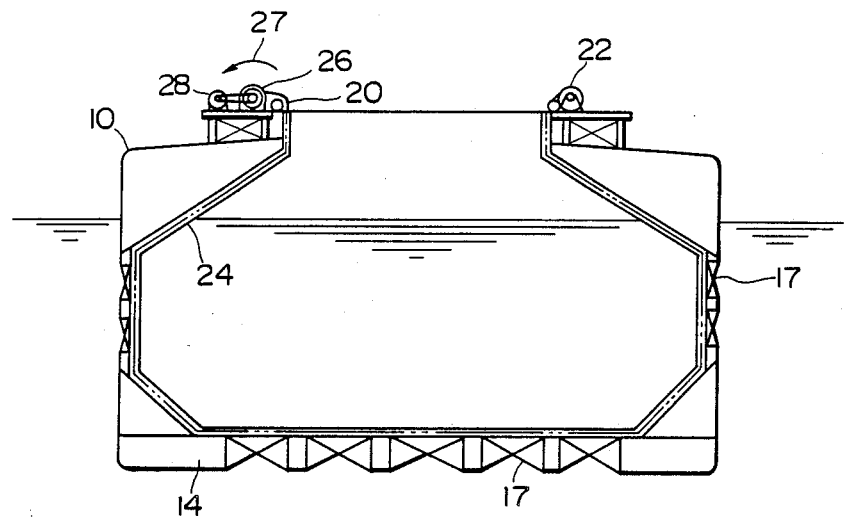
FIG. 2 is a sectional view of the embodiment shown in FIG. 1.
Figure 3:
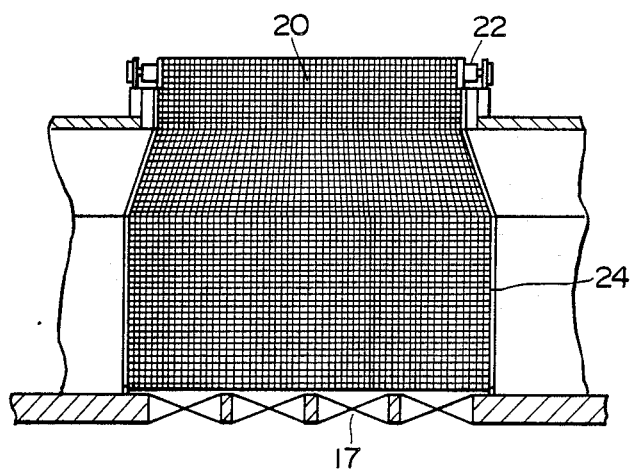
FIG. 3 is a side elevational section view of the embodiment shown in FIG. 1.

As noted above, FIG. 1 shows a partial broken view illustrating perspectively fish breeding apparatus with an exchangeable net for farming fish. FIG. 2 is a sectional view of the apparatus illustrated in FIG. 1. FIG. 3 is a sectional elevational view of the apparatus illustrated in FIG. 1.

Figure 1:
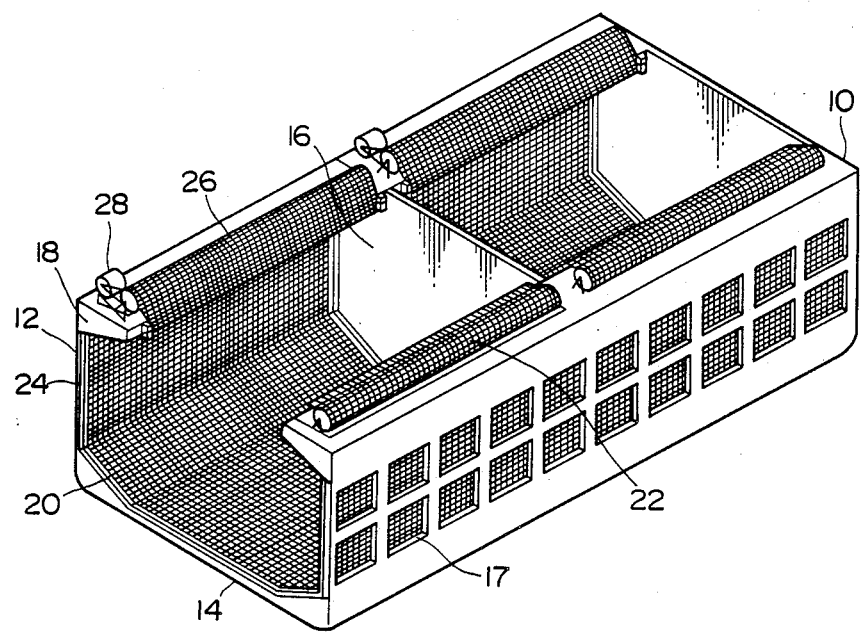
FIG. 1 is a partial broken view showing in perspective an outline of an apparatus according to the present invention with an exchangeable net for a fish breeding apparatus for farming fish.

Referring now to FIG. 1, a hull shaped fish cage breeding apparatus or 10 for farming fish is illustrated the breeding apparatus 10 comprises side platings 12, bottom plating 14, screen bulkheads 16 and decks 18. In side platings 12 and bottom plating 14, openings 17 are formed to let water flow in and out. On one of the decks 18, pay out rollers are provided 22 for paying out net 20. Each side edge of net 20 is guided by a guide rail 24 so that the net is paid out into apparatus 10 through a predetermined path. Guide rail 24 is set along the inner walls of side platings 12 to part of the form means for guiding the net. The net 20 is transferred from each roller 22 and coiled up by means for coiling up the net set on the other side of breeding apparatus 10. The means for coiling up the net comprise coil up rollers 26 the net on to which is wound and motors 28 for driving each roller 26. Each roller 26 is connected through a belt with motor 28 to work with the motor. By starting one of the motors, roller a 26 rotates. Net 20 has the form of a long continuous belt, and continues to be paid out from roller 22 to roller 26, covering the inner wall of fish breeding apparatus 10. That portion of net 20 which is not yet used remains rolled up on roller 22.

When the net is to be transferred or exchanged by an apparatus for exchanging the net as described above, motor 28 is started so that the roller 26 rotates in a direction indicated by an arrow 27 in FIG. 2. The net is pulled in the direction of roller 26. Since the net is arranged so that the net can move freely as it is guided with the aid of guide rail 24 set at both sides of the net, the net proceeds toward roll 26. As net 20 proceeds, an unused portion of net 20 is pulled out from roll 22, and, with rotation of roll 22, pays out into the inside of fish breeding apparatus 10. When all of the portion of net 20 which has been contaminated and used up is coiled up on roller 26 and the used up portion of the net has completely replaced the clean portion of the net, the exchange of the net between rollers 22 and 26 is finished.

Figure 4:
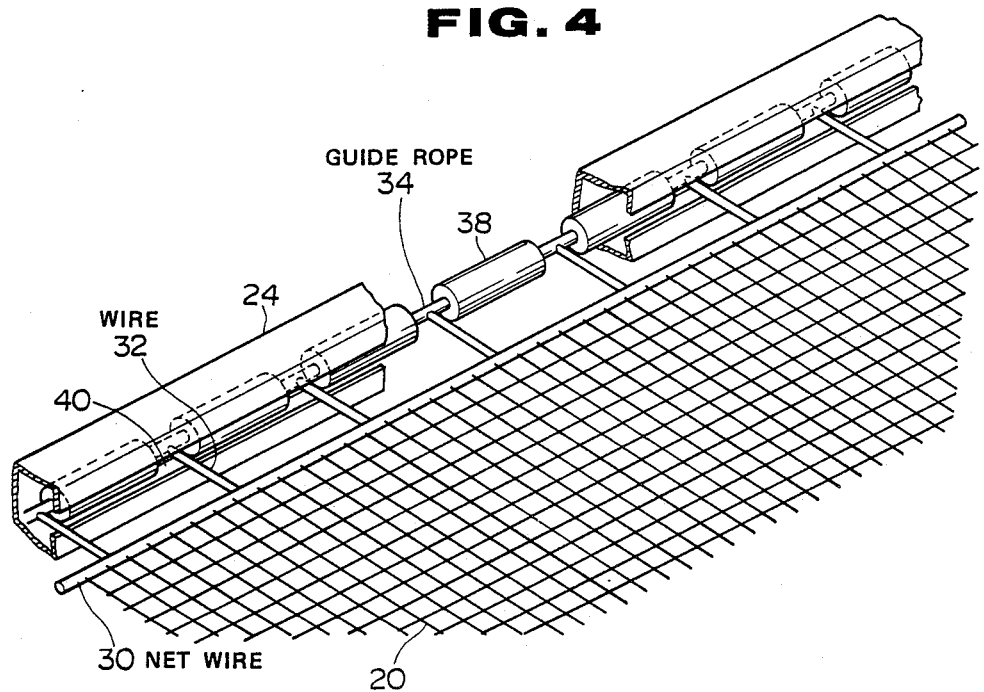
FIG. 4 is a partial perspective view showing a guide rail portion of the embodiment of FIG. 1.
Figure 5:
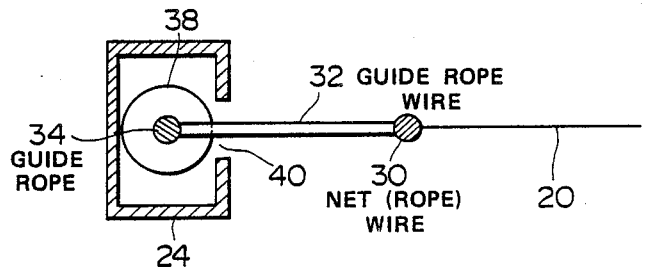
FIG. 5 is a partial sectional view showing a guide rail portion of the embodiment of FIG. 1.

Means for guiding net 20 will be now described with specific reference to FIGS. 4 and 5 of drawings. FIG. 4 is a perspective view showing a portion of guide rail 24. FIG. 5 is a sectional view showing a portion of the guide rail. At least one side of the guide rail is fixed on the inner wall of fish cage 10. The means for guiding net 20 is connected by joint wires 32 with edge wire 30, which forms a side edge of the net. The means for guiding the net comprises guide rope 34 movable in guide rail 24, and guide floats 38, which hold guide rope 34 to which joint wires 32 are fixed. Guide floats 38 are fitted to guide rope 34 at certain intervals. Edge wire 30 is connected with a multiplicity of joint wires 32. Guide rail 24 embraces the guide floats 38 fitted to guide rope 34, and has opening 40, so that joint wires 32 connecting edge wire 30 with guide rope 34 can advance in the direction in which guide rope 34 leads. Guide floats 38 have a diameter larger in width than the size of opening 40. Therefore, even if tension works in a joint direction of net 20, guide rope 34 does not come off out of guide rail 24. It is preferable that a slight clearance is provided between the inner wall of guide rail 24 and guide floats 38 so as to make the coefficient of friction of the inner wall small enough to allow the guide floats move smoothly in guide rail 24.

Since the constitution of guide rail 24 is constituted as described, transference of net 20 is carried out smoothly when the net is exchanged. In addition, because each guide rail 24 is set on both side edges of the net at an appropriate distance so that the net is not loosened or has some tension, the net can be affixed in the inner wall of fish cage 10 without slack. Furthermore, if joint wires 32 are short enough in length to prevent fish from escaping, fish can readily be kept in fish cage 10.

Figure 6:
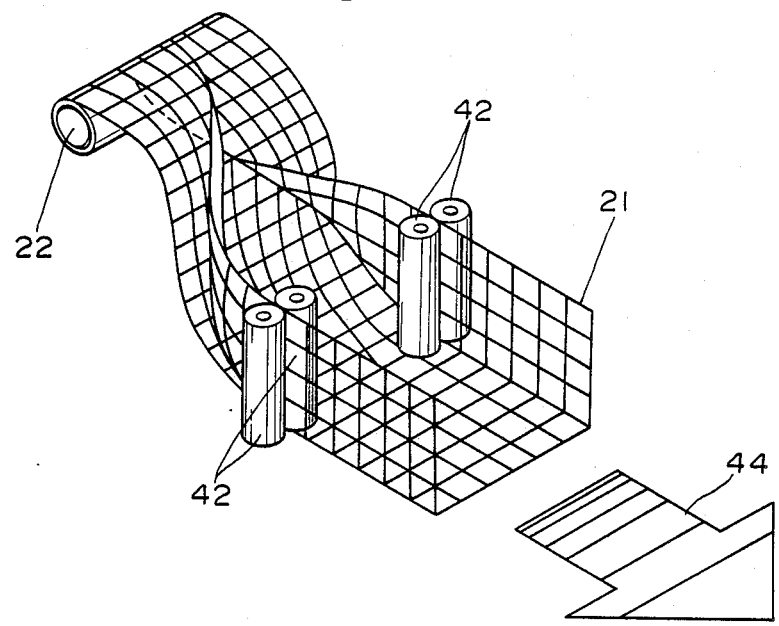
FIG. 6 is in representation showing a principle another embodiment of an apparatus with an exchangeable net for a fish breeding apparatus according to the present invention.

FIG. 6 shows, in principle, another embodiment of an apparatus for exchanging a net of a fish breeding apparatus for farming fish of the present invention. In FIG. 6, reference numeral 21 denotes a net, and the net is unrolled from roller 22 for paying out the net, which is folded in three. Four rollers, designated by reference number 42, form a means for unfolding the folded net 21. The four rollers are arranged so as to stand in two pairs perpendicularly on each of the two lines formed by the fold each of two perpendicularly folded portions of the net are put between one of the two pairs of rollers 42. When net 21 is pulled in a direction indicated by arrow 44, the folded net is pulled into the shape of a ditch and is transferred in the direction of arrow 44. A fish breeding apparatus for farming fish is formed by making use of this ditch shape portion of the net. The fish breeding apparatus formed in this manner can be provided with net 21 covering sides of the fish breeding apparatus. Consequently, even if openings are formed in screen bulkheads 16 to provide circulation of sea water, young fish can be prevented from moving to another fish cage.

Figure 7:
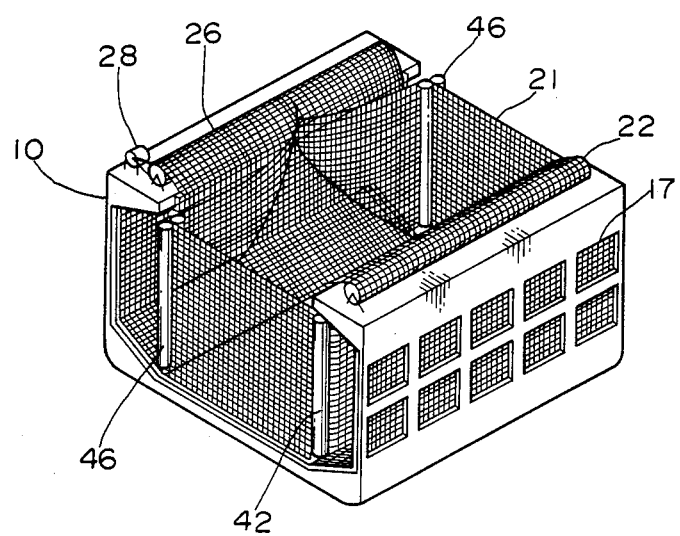
FIG. 7 is a perspective view showing an outline of a specific construction of the embodiment of FIG. 6.
Figure 8:
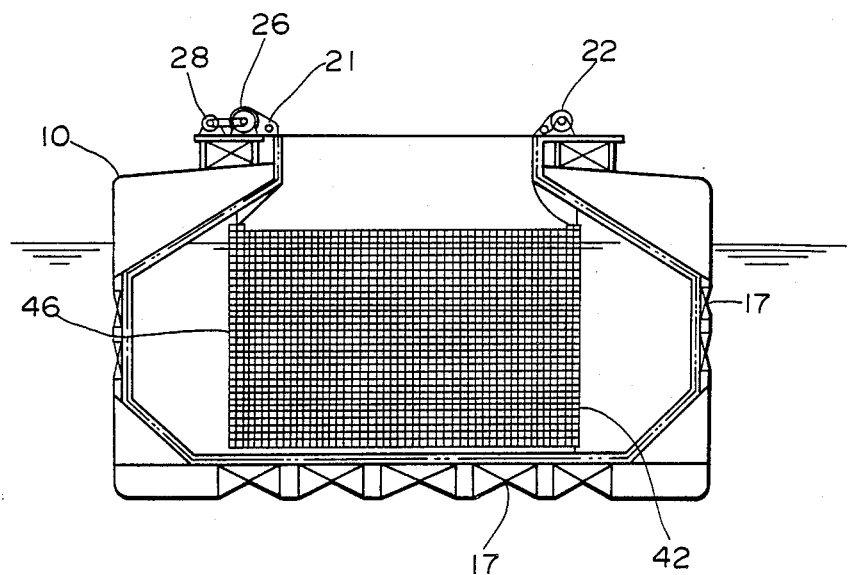
FIG. 8 is a sectional view of the embodiment shown in FIG. 7.

Next, a specific construction of the second embodiment will be described. FIG. 7 is a perspective view showing an outline of a specific constitution of the second embodiment of the present invention. FIG. 8 is a sectional view of FIG. 7. In the drawings, an unused portion of net 21, which has been rolled in a triplicate fold on to pay out roller 22 for paying out the net, is unrolled from roller 22. As the net is unrolled, it is unfolded by means of first rollers 42 for unfolding the net. Rollers 42 are set on the paying-out side of roller 22, as described with reference to FIG. 6, to form a ditch shaped fish breeding apparatus for farming fish. Rollers 42 are formed from two pairs of rollers. When net 21 passes through second rollers 46, which are provided for folding the net, the net makes a completely opposite movement from the movement shown in FIG. 6. In other words, as the net comes near coil up roller 26, the net is gradually folded in three. When the net reaches roller 26, the net is in the state of being folded in three and is coiled up by roller 26. It is preferable that a distance between rollers 42 for unfolding the net on the paying-out side of the apparatus and rollers 46 for folding the net on the coiling-up side of the apparatus is such that the net is given a certain, appropriate tension.

Figure 9:
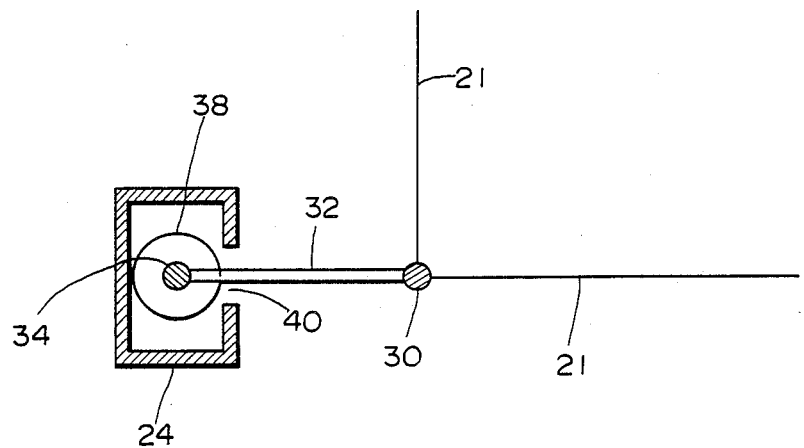
FIG. 9 is a sectional view of a guide rail portion of the embodiment of FIG. 6.

FIG. 9 is a sectional view of a guide rail portion of the present invention. It should be noted that in this view, the guide rail portion is constructed and functions in the same manner as the first embodiment described and differs from the first embodiment in that in the construction of net 21, edge wire 30 is replaced by the fold of net 21.

In the embodiments mentioned, coiling of the net is carried out by a motor; however, such coiling is not necessarily limited to coiling by a motor. In addition, the shape of the guide rail is not always limited to that described in the above embodiments. Any shape can be provided to the guide rail, so long as the side edge of the net can be smoothly moved. For example, a shape which is cylindrical or C-shaped in section can be used.

Figure 10:
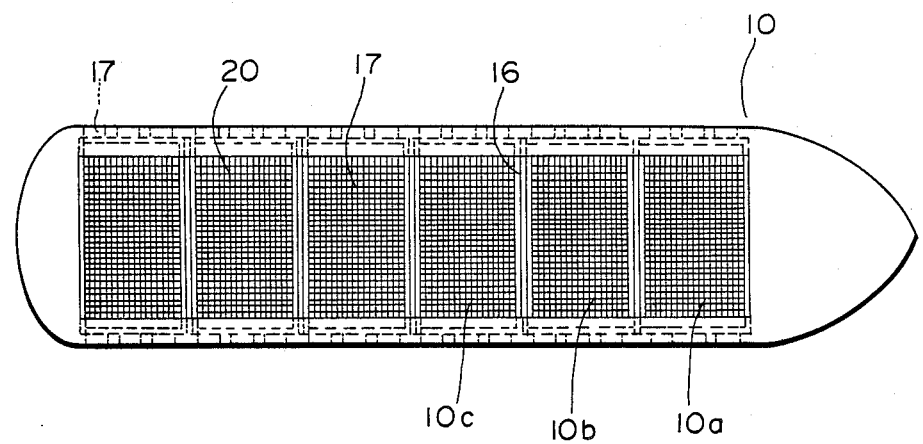
FIG. 10 is a plan view showing a hull shaped fish breeding apparatus with an exchangeable net for farming fish.
Figure 11:
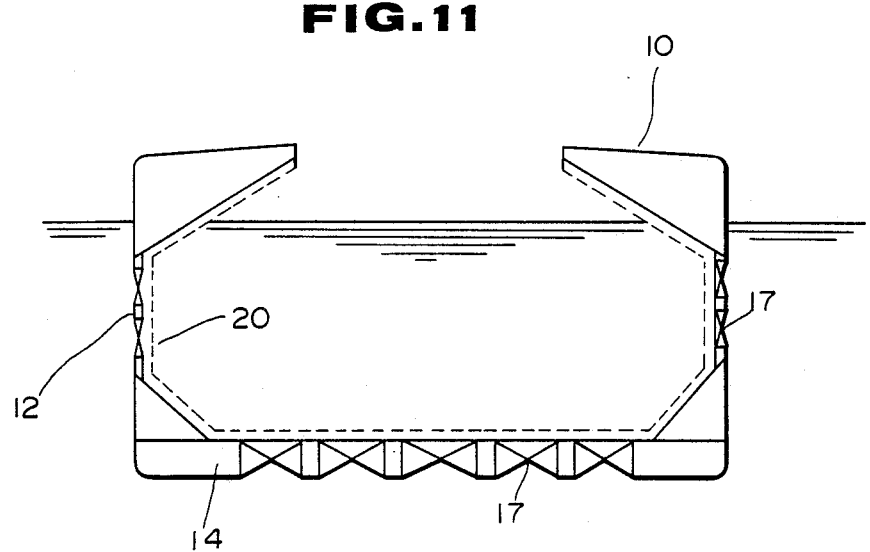
FIG. 11 is a sectional view of the apparatus shown in FIG. 10.

FIG. 10 is a plan view showing an embodiment of a fish breeding apparatus having a hull shape for farming fish according to the present invention. FIG. 11 is a sectional view of the hull shaped fish breeding apparatus shown in FIG. 10. In FIGS. 10 and 11, reference number 10 denotes the whole body of a fish breeding apparatus for farming fish, number 16 a screen bulkhead, number 17 an opening and number 20 is a net. The whole body 10 of the fish cage is of a hull shape, and screen bulkheads 16 are set at right angles to the longitudinal axis line of the whole body of the fish cage. Portions partitioned by bulkheads 16 form a plurality of fish breeding containers 10a, 10b, 10c, ect. for farming fish. Openings 17 are formed in side platings 12 and bottom plating 14 of the whole body of the fish cage. Sea water flows in and out through openings 17, and sea water circulation is fully activated in the whole body of the fish breeding apparatus for farming fish.

What is claimed is:

1. A fish breeding apparatus with an exchangeable net comprising:
    a hull shaped fish cage having side platings, a bottom plating, screen bulkheads and a deck, said side platings and said bottom plating having openings provided therein;
    a net;
    pay out means for paying out the net into the cage;
    guide means for guiding an end of the net through a predetermined path adjacent said platings; and
    coil up means for coiling up the net.

2. The apparatus according to claim 1, wherein the net has the form of a long continuous belt, and wherein said guide means net comprises:
    a guide rope and guide floats, the guide rope being connected, through joint wires, to said side edge of the net and moving in a guide rail for guiding the net, the guide floats being fixed to the guide rope and holding the guide rope within the guide rail.

3. The apparatus of claim 1, wherein said pay out means includes a pay out roller around which the net to be paid out is coiled.

4. The apparatus of claim 1, wherein said guide means includes a guide rail embracing guide floats and having an opening, said guide floats being fitted to a guide rope which is connected, through joint wires, to a side edge portion of the net, the opening letting the joint wires advance in a direction in which the guide rope leads.

5. The apparatus of claim 1, wherein said coil up means comprises a coil up roller and a motor for driving the coil up roller.

6. The apparatus of claim 1, wherein
    said pay out means includes a pay out roller around which the net is coiled for use;

said guide means includes a guide rail embracing guide floats and having an opening, said guide floats being fitted to a guide rope which is connected, through joint wires, to a side edge portion of the net, the opening letting the joint wires advance in a direction in which the guide rope leads; and said coil up means comprises a coil up roller and motor for driving the coil up roller.

7. A fish breeding apparatus with an exchangeable net comprising:

a hull shaped fish cage having side platings, a bottom plating, screen bulkheads, and a deck, said side platings and said bottom plating having openings provided therein;

a net;

pay out means for paying out the net into the cage, the net having folded portions and being coiled around said pay out means;

unfolding means for unfolding said folded portions of the net;

folding means for refolding the net to form refolded portions; and coil up means for coiling up the refolded net.

8. The apparatus of claim 7, wherein said pay out means includes a pay out roller around which the net to be paid out is coiled.

9. The apparatus of claim 7, wherein said unfolding means includes a first pair of rollers, unfolded portions of the net passing between the rollers.

10. The apparatus of claim 7, wherein said folding means includes a second pair of rollers, each unfolded portion of the net passing between the rollers of the second pair of rollers for refolding.

11. The apparatus of claim 7, wherein said coil up means comprises a coil up roller and a motor driving the coil up roller.

12. The apparatus of claim 7, wherein said pay out means includes a pay out roller around which the net is coiled for use; and said unfolding means includes a first pair of rollers, unfolded portions of the net passing between the rollers.

* * * * *